H. P. DAGGETT.
CHURN.
No. 188,863. Patented March 27, 1877.
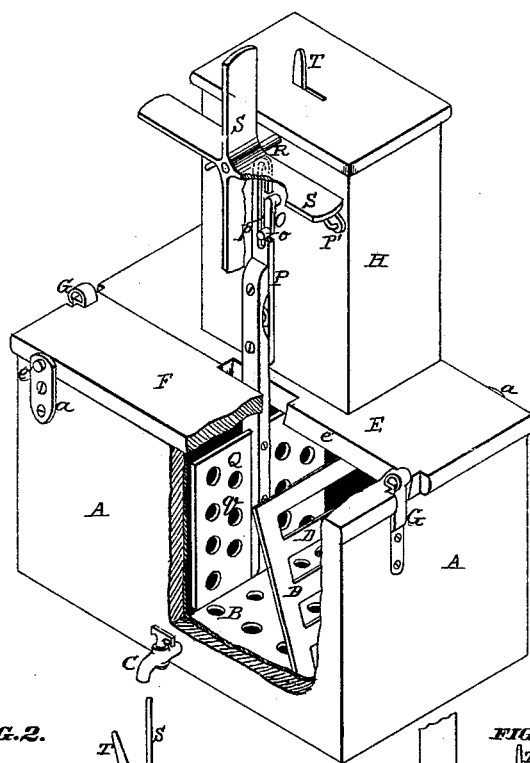
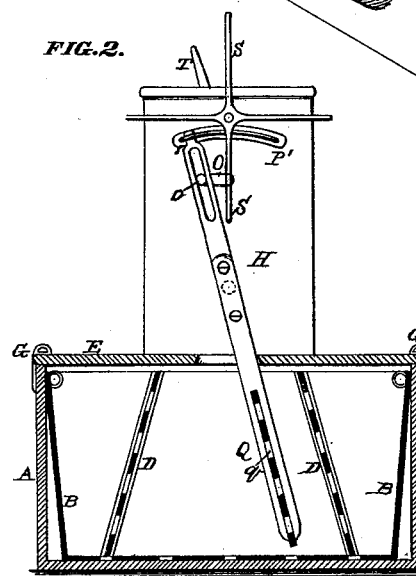
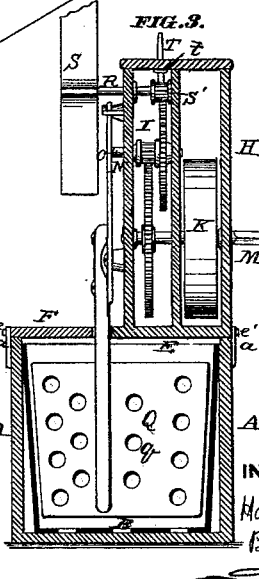
ATTEST:
Rob't Burns
Chas Pickles
INVENTOR:
Harry P. Daggett
By Knight Bros
Atty's

UNITED STATES PATENT OFFICE.

HARVY P. DAGGETT, OF TROY, MISSOURI, ASSIGNOR OF ONE-THIRD HIS RIGHT TO ALLIE B. ELLIS, OF SAME PLACE.

IMPROVEMENT IN CHURNS.

Specification forming part of Letters Patent No. 188,863, dated March 27, 1877; application filed July 14, 1876.

*To all whom it may concern:*

Be it known that I, HARVY P. DAGGETT, of Troy, Lincoln county, State of Missouri, have invented a certain new and useful Improvement in Churns, of which the following is a full, clear, and exact description, reference being had to the accompanying drawings, making part of this specification.

My improvement consists in constructing a churn with a dasher, which moves to and fro between two perforated partitions or slides in the cream-vessel. The cream-vessel contains a removable tray or vessel having nearly equal capacity to the outer vessel, and with a perforated bottom, to allow the buttermilk to run out, when the tray or inner vessel is raised to separate the butter from the buttermilk, or to lift any solid matter from the liquid.

In the drawings, Figure 1 is a perspective view, with part broken away to exhibit the interior. Fig. 2 is a longitudinal section of the cream-receptacle, showing the gear-box in front view. Fig. 3 is a transverse section.

A is the outer case of the cream-receptacle, made water-tight. The vessel A contains a removable vessel, B, whose bottom, or bottom and sides, are perforated to allow the escape of liquid when the vessel B is raised, or when the contents of the vessel A is allowed to escape through the faucet C. D D are two transverse inclined removable perforate partitions supported by cleats at the sides of the vessel B.

The cover of the receptacle A is in two parts, E and F, fitted together with a bevel-joint, e, whose inclination prevents the escape of cream by splashing. These cover-pieces E and F are secured to the receptacle at their outer edges by pins $e'$, which extend horizontally out from the edges through vertical ears $a$ on the edges of the receptacle A. In addition to these fastenings $e'$ $a$ at the sides of pieces E and F, said pieces are held down by spring-catches G G, taking over the ends of the piece F, whose inner edge forms the upper member of the bevel-joint $e$, and so holds the inner edge of the part E down.

The gear-box H is attached to the part E of the cover, and contains a system of cog-gearing, I, with driving-spring K.

The spring L is on the winding-shaft M, which is connected by wheel and pinion with the shaft N, whose outer end carries a crank-arm, O, outside the gear-box. The wrist-pin $o$ of this crank passes through a longitudinal slot, $p$, in the oscillating rod or arm P, to whose lower end the transverse dasher is attached.

The dasher Q has, preferably, numerous orifices, $q$, through which the cream passes as the dasher is moved.

The upper end of the rod P works in a guide, P'.

The upper (and fastest-running) shaft R carries at the outer end a fly, S, to assist the dasher in regulating the speed of the parts. This fly, in addition to its office as speed-regulator, serves to keep away insects from the dasher-orifice in the lid.

T is a detent, turning on the fulcrum-point $t$, and whose lower end, when it is in one position, engages with the cogs of the pinion S' on shaft R, so as to stop the mechanism; but in the other position of the detent the cogs of pinion S' are not engaged by the detent.

The device forms a good mixer for any liquid.

I claim—

The churn, consisting of outer receptacle A, inner stationary vessel B, having inclined perforated partitions D D, and dasher P Q, as and for the purpose set forth.

HARVY P. DAGGETT.

Witnesses:
JOSEPH B. ALLEN,
E. M. BROWNING.